Aug. 30, 1966   E. E. HIEBER ETAL   3,269,736
DYNAMIC SEAL FOR CRYOGENIC USE
Filed March 25, 1963
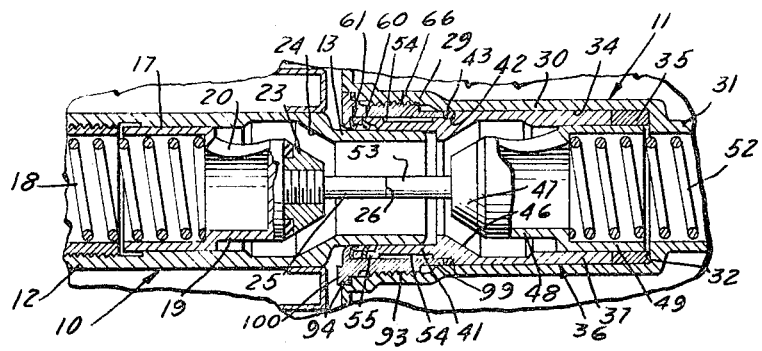
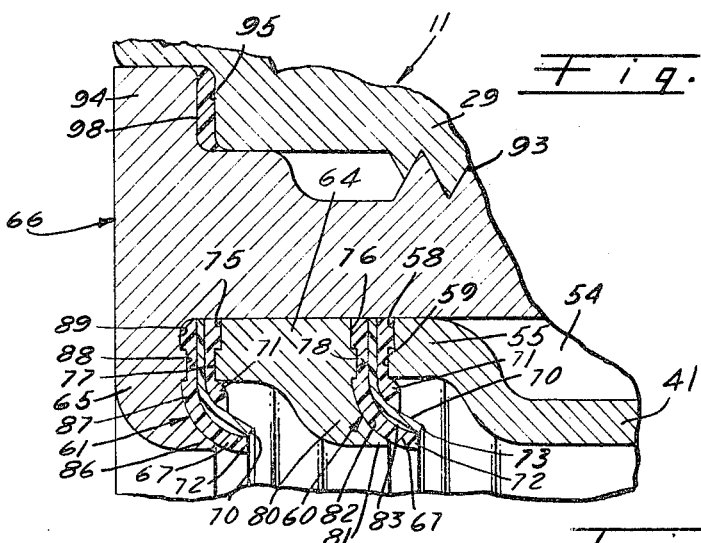
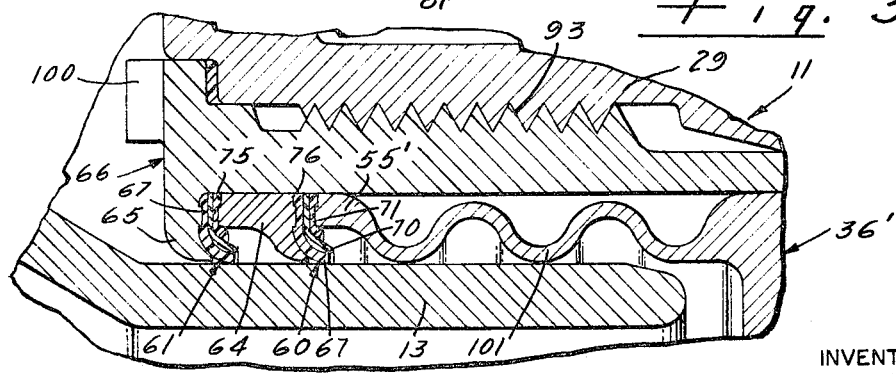
INVENTORS
ELLSWORTH E. HIEBER
DONALD G. LAWELL
WHANN & McMANIGAL
*Attorneys for Applicant*
by Robert M. McManigal United States Patent Office 3,269,736
Patented August 30, 1966

1

3,269,736
DYNAMIC SEAL FOR CRYOGENIC USE
Ellsworth E. Hieber, Glendale, and Donald G. Lawell, Hacienda Heights, Calif., assignors to Schulz Tool and Manufacturing Co., San Gabriel, Calif., a corporation of California
Filed Mar. 25, 1963, Ser. No. 267,692
12 Claims. (Cl. 277—26)

This invention relates to a seal and, more particularly, to a seal for use in extreme temperatures.

It is an object of the invention to provide a seal for use in a range of temperature differences of at least 600° F. and for working pressures of 2500 pounds per square inch and higher.

It is another object of the invention to provide a seal for an annular space between two axially slidably engaged members and which will retain its flexibility and resilience at extreme lower pressures.

It is still another object of the invention to provide an improved seal for use with cryogenics.

It is a further object of the present invention to provide an improved seal for use between two slidably engaged members.

It is a still further object of the invention to provide a seal for use in extreme low temperatures and which will not contract excessively.

It is another object of the present invention to provide a seal in which there is provided means to compensate for any of the contraction within the seal at extremely low temperatures.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is a fragmentary cross sectional view of slidably engaged annular parts, having a seal according to the invention fitted in one of the parts and slidably engaged with the other to seal the annular space between the parts;

FIG. 2 is an enlarged fragmentary cross sectional view illustrating a plurality of seals according to the present invention, as shown in FIG. 1; and FIG. 3 is an enlarged fragmentary view of a plurality of seals according to the invention, illustrating another embodiment of a thermal contraction compensating means.

Referring again to the drawings, there is shown in FIG. 1, one end of a male member or nipple, generally designated as 10, which is slidably and sealingly engaged in a female member or socket, generally designated as 11. The nipple 10 is comprised of a large diameter tubular portion 12, having on its outer end a cylindrical, small diameter tubular portion 13. Slidably engaged within the large diameter tubular portion 12 is a cylindrical sleeve 17, normally biased to the right, in FIG. 1, by a coil spring 18. The left end of spring 18 abuts a shoulder, not shown, within the tube 12.

Extending from the cylinder 17 is a small diameter cylindrical portion 19, having a plurality of openings 20 to provide a flow passage from the tube 13 into the interior of the cylinders 19, 17 and 12.

At the end of the cylinder 19 is a poppet valve 23 which closes the nipple 10 when the valve is moved into sealing contact with conical seat 24 formed adjacent the end of the large diameter tubular member 12. Extending outwardly from the poppet valve 23 is a centrally positioned pin 25. Axially directed force against outer end 26 of the pin 25 in excess of the force of the spring 18 lifts the poppet 23 off of its seat 24. When such force is removed, the spring 18 seats the valve 23 so as to sealingly close the nipple 10.

Forming the outer casing for the socket 11 are integral, consecutive, large diameter cylindrical portion 29, intermediate diameter cylindrical portion 30, and small diameter cylindrical portion 31. An annular shoulder 32 is formed where the cylindrical portions 30 and 31 are joined. Extending from the shoulder 32 is a cylinder 34 and slidably engaged in the latter is a ring 35 made of a low thermal expansion alloy, such as "Invar." The other materials, that is, the metals from which the parts of the nipple 10 and the socket 11 are made, have in comparison with "Invar," a relatively high thermal coefficient of expansion, the parts in question usually being made of steel.

In abutment with the ring 35 and slidably engaged in the cylinder 34 is a sleeve 36 having a large diameter body 37 and a small diameter cylindrical extension 41.

Between the small diameter portion 41 and the large diameter portion 37 is a radially outwardly directed shoulder 42, and in abutment therewith is an annular sealing member 43, providing an axial seal between the sleeve member 36 and the outer shell member of the socket 11.

Within the sleeve 36 is a conical seat 46 for a normally closed poppet valve 47. The valve 47 is of the same type as the valve 23 and is fixed on an intermediate cylindrical member 48 formed on a large diameter portion 49, slidably engaged within the body 37 of the sleeve 36. Within the cylindrical portion 49 is a coil spring 52 having its right end in abutment with shoulders, not shown, in the cylindrical portion 31 and having its left end, as shown in FIG. 1, in abutment with a radial shoulder at the end of the cylindrical portion 49 so as to bias the poppet 47 into a normally closed position on the seat 46. Extending outwardly from the poppet 47 is a pin 53, centrally positioned and of the proper length, relative to the pin 25, so that when the nipple 10 is inserted into the socket 11, both of the poppet valves, 23 and 47, are automatically opened.

As may be best seen in FIGS. 1 and 2, the small diameter portion 41 of the sleeve 36 has a circumferential groove 54 and the portion 41 terminates axially in an end 55 to provide a relatively, radially narrow seal abutting member having an axially recessed, radial surface 58 and an axially extending, radial surface 59.

Axially outwardly of the end 55 are two spaced dynamic sealing structures 60 and 61. These seals are identical and may be used singly or in multiples. Between the seals is a spacer 64 and axially outwardly of the seal 61 is a flange portion 65 of a seal retaining sleeve 66.

As best seen in FIG. 2, each sealing structure is comprised of three laterally abutting rings 67, 70 and 71. The first ring 67 makes the sealing contact with its lip 72 on the tube 13. This ring may be flat when it is secured within the socket or, as may the other rings, be pre-formed. The ring 67 is made of polytetrafluoroethylene.

The second ring 70 has the same outside and inside diameters as the first ring 67 but it is somewhat thinner in thickness. It serves as a spring, having its lip 73 forcing the lip 72 into sealing contact with the nipple member 13. The ring 70 is made of "Mylar" which is polyethylene terephthalate or poly(1,4-cyclohexylenedimethylene terephthalate). It, like polytetrafluoroethylene, remains flexible at extremely low temperatures, but also is more resilient at low temperatures to provide the spring action required.

The third ring 71 provides a static seal around the outside diameters of the rings, in the position shown, and it also is made of polytetrafluoroethylene. As may be seen, the ring 71, when used on a female part, has the same outside diameter as the other two rings but has a larger inside diameter. If the seal were provided on the male part, the rings 67 and 70 could have their respective, equal inside and outside diameters but the static seal ring 71 would be provided with the same inside diameter as the other two rings but have a smaller outside diameter.

The compressive force by the retainer 66 causes the extended portion 59 of the end 55 to form an annular groove in the ring 71 and, additionally, compresses the outer portion of the ring 71 adjacent the circumference into a groove formed along the recessed surface 58 of the sleeve end 55. This type of configuration prevents the cold-flow of polytetrafluoroethylene out of its sealing contact at extreme low temperatures.

The spacer 64 is an annular ring slidably engaged along the inside circumference of the retainer 66 and in its opposite axial faces has recessed portions 75 and 76 and radially inwardly thereof, has extended portions 77 and 78, respectively. The extension 78 forms a groove within the polytetrafluoroethylene seal 67 of the sealing structure 60, as does the extension 77, in the seal 71 of the sealing structure 61 in the same manner as described in regard to the extension 69 relative to the seal 71 of the sealing structure 60.

The axially inward portion of the spacer 64 has a radially inwardly directed, annular flange 80 terminating in axially directed lip 81, radially outwardly or away from the male member 13 and radially outwardly relative to the lip 72 of the seal 67 of the sealing structure 60. The face 82 of the flange 80 is concave and faces axially toward the sealing structure 60 so as to force the seal 67 and the spring 70 into the curved positions shown so that the lip 73 of the spring is radially inwardly of the lip 72, the latter being forced into contact with the male member 13 by the spring action. As the spring 70 is somewhat more rigid than the seal 67, it does not conform exactly to the latter and there is an annular space 83 between the two.

The annular flange 65 of the retainer, similar to the flange 80 of the spacer, terminates radially inwardly in an axially directed lip 86 and has an axially directed concave inner face 87 of the same configuration as the face 82 of the spacer. Radially outwardly of the face 87 is an annular, axial extension 88 which compresses a groove into the seal member 67 of the sealing structure 61. As shown, the lip 72 of the seal 67 is radially inwardly of the lip 86 of the retainer so that the former makes sealing contact with the male member 13 and so that the latter lip is spaced radially outwardly, away from the male member.

Radially outwardly of the extension 88 is an annular groove 89 which, together, provide the same results as the extension 77 and the recession 75, respectively, in an opposite side of the seal 67 of the structure 61.

The retainer 66 is threadedly engaged at threads 93 within the cylindrical portion 29 of the socket 11 and is tightened so as to compress sealing structures 60 and 61, as shown, and to provide a sealing relationship between cylindrical portion 41 at its end 55 and the retainer, and between the spacer 64 and the retainer. When the retainer is in tightened position, its radially outwardly directed flange 94 is spaced from a shoulder 95 in the cylindrical portion 29 so as to provide room for an annular seal 98 which is compressed by the tightened retainer.

As shown in FIG. 1, the annular axially directed inner end 99 of the retainer is in compression and sealing relationship with the seal 43 to provide a seal between the cylindrical portion 30 of the socket 11 and the cylindrical portion 37 of the sleeve 36. The retainer 66 is tightened by means of a special wrench acting on axially directed lugs 100 which are best seen in FIGS. 1 and 3.

In operation, at extremely low temperatures, the sealing structures tend to contract more than the surrounding metal, here, steel, and thus, would tend to become relatively loose in the retaining means. This is prevented by the "Invar" ring 35 which, at low temperatures, contracts less than the socket 11, the sleeve 36, the spacer 64, the retainer 66 and the seals. Thus, the excess shrinkage of the seals is compensated for by the lower amount of shrinkage in the ring 35.

Further, at extremely low temperatures, as well as elevated temperatures, the "Mylar" spring members 70 always retain their resilience and effectively maintain the lips of the sealing members 67 in their sealing contacts with the outer surface of the male member 13.

In FIG. 3, another embodiment of the invention is shown. Here, the seals and retainer are of the same configuration as in FIGS. 1 and 2, but the low thermal expansion alloy 35 is substituted for by a relatively heavy, annular convoluted-shaped spring 101 which replaces cylindrical portion 41 in a sleeve member, such as 36 in FIG. 1, and here designated as 36'. At the outer portion of the spring 101 is an end structure 55', equivalent to end 55 on the sleeve 36.

In this embodiment, when the retainer 66 is tightened into the housing 11, spring 101 is forcibly compressed so that sufficient stored energy is created therein so that it will act upon the seal structures 60 and 61, holding them in tight sealing engagement, through a full range of operating temperatures from approximately −425° F. to 200° F., for example. That is, specifically at the low temperatures, as the sealing structures 61 and 60 tend to contract more than the metal around them, the spring 101 acts to compensate for the shrinkage of the seals and holds them in their proper positions to prevent leakage even after contraction.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims, wherein various portions have been separated for clarity of reading and not for emphasis.

We claim:

1. An annular seal for slidably engageable annular members for use in extreme variations of temperature, said seal comprising:
 (a) a first ring of polytetrafluoroethylene;
 (b) a second ring of resilient material of one of the group consisting of polyethylene terephthalate and poly (1,4-cyclohexylene-dimethyl terephthalate) and being relatively stiffer than said first ring material and being substantially unaffected in resiliency by extreme temperatures;
 (c) a third ring of polytetrafluoroethylene,
 (d) said first ring having a lateral face in abutment with a lateral face of said second ring and said second ring having its other lateral face in abutment with a lateral face of said third ring; and
 (e) metal means axially, compressingly retaining said rings on a first member along an annular surface thereof which is slidably engageable along an annular surface of a second member, said rings to form a seal in an annular space between said members,
 (f) said rings being compressingly arranged so that a lip of said first ring is adapted to make a sealing contact with said annular surface of said second member;
 (g) a lip of said second ring biasing said first ring away from said first member and said lip of said first ring being radially between the lip of said second ring and said second member, (h) said lips of said first and second rings being generally radially between said third ring and second member.

2. An annular seal for slidably engageable annular members for use in extreme variations of temperature, said seal comprising:
 (a) a first ring of polytetrafluoroethylene;
 (b) a second ring of resilient material of one of the group consisting of polyethylene terephthalate and poly(1,4 - cyclohexylene-dimethylene terephthalate) and being relatively stiffer than said first ring material and being substantially unaffected in resiliency by extreme temperatures;
 (c) a third ring of polytetrafluoroethylene,
 (d) said first ring having a lateral face in abutment with a lateral face of said second ring and said second ring having its other lateral face in abutment with a lateral face of said third ring; and
 (e) metal means axially, compressingly retaining said rings on a first member along an annular surface thereof which is slidably engageable along an annular surface of a second member, said rings to form a seal in an annular space between said members,
 (f) said last means being annular and including an axially diverging, curved portion extending radially away from said first member and terminating in an axially directed circumferential lip extending toward said rings,
 (g) said curved portion being in abutment with the other lateral face of said first ring to hold the circumferential end portion thereof, which extends away from said first member, to form an axially directed circumferential lip extending toward said other rings and extending radially away from said first member a greater distance than said lip on said curved portion;
 (h) a lip of said second ring biasing asid first ring away from said first member and said lip of said first ring being radially between the lip of said second ring and second member,
 (i) said lips of said first and second rings being generally radially between said third ring and said second member.

3. In two slidably engaged members having an annular space therebetween to be sealed, an annular sealing structure comprising:
 (a) a first member slidably engaged with a second member;
 (b) an annular space between said members;
 (c) first and second abutting resilient rings secured on one of said members and having one of their circumferential edges extending toward said second member,
 (d) said second ring being more rigid and more resilient at lower temperatures than said first ring;
 (e) a lip at said one circumferential edge of said first ring making a sealing contact with said second member;
 (f) a lip at said one circumferential edge of said second ring biasing the lip of said first ring toward and into said sealing contact with said second member,
 (g) said lip of said first ring being radially between the lip of the second ring and said second member;
 (h) annular means compressingly engaging said rings on said first member; and
 (i) annular low thermal expansion means in compression alignment with said last means to maintain said rings in sealing compression at low temperatures,
 (j) said low thermal expansion means having a lower thermal coefficient of expansion than said rings.

4. In two slidably engaged members for use in extreme temperatures and having an annular space therebetween to be sealed, an annular sealing structure comprising:
 (a) a first member slidably engaged with a second member;
 (b) an annular space between said members;
 (c) first and second abutting resilient elastomeric rings secured on one of said members and having one of their circumferential edges extending toward said second member,
 (d) said second ring being more rigid and more resilient at lower temperatures than said first ring;
 (e) a lip at said one circumferential edge of said first ring making a sealing contact with said second member;
 (f) a lip at said one circumferential edge of said second ring biasing the lip of said first ring toward and into said sealing contact with said second member,
 (g) said lip of said first ring being radially between the lip of the second ring and said second member;
 (h) a static elastomeric seal ring abutting the side of said second ring facing away from said first ring; and
 (i) means compressively engaging said rings and said static seal means on said first member,
 (j) said last means including a first part secured to said first member,
 (k) said first part extending radially and having an axially facing concave surface terminating radially away from said first member in an axially directed, circumferential lip,
 (l) said lip on said first ring extending farther from said first member than said lip on said first part,
 (m) said concave surface of said first part being in abutment with said first ring,
 (n) said lip of said first ring extending in the same axial direction as said lip on said first part,
 (o) said last means including a second part, said second part being annular and having a lower thermal coefficient of expansion than said rings to compensate for any contraction of said rings at low temperatures in excess of the contraction of said first member and said compressively engaging means.

5. The invention according to claim 4 in which said first and third rings are comprised of polytetrafluoroethylene and said second ring is one of the group consisting of polyethylene terephthalate and poly(1,4-cyclohexylene-dimethylene terephthalate).

6. In two slidably engaged members for use in extreme temperatures and having an annular space therebetween to be sealed, a plurality of annular sealing structures;
 (a) a first member slidably engaged with a second member;
 (b) an annular space betwen said members; each of said sealing structures comprising:
 (c) first and second abutting resilient elastomeric rings secured on one of said member and having one of their circumferential edges extending toward said second member,
 (d) said second ring being more rigid and more resilient at extreme lower temperatures than said first ring;
 (e) a lip at said one circumferential edge of said first ring making a sealing contact with said second member;
 (f) a lip at said one circumferential edge of said second ring biasing the lip of the first ring into sealing contact with said second member,
 (g) said lip of said first ring being radially between the lip of the second ring and said second member;
 (h) a static elastomeric ring abutting the side of said second ring facing away from said first ring;
 (i) means compressively engaging said rings on said first member,
 (j) said last means including a first part secured to said first member,
 (k) said first part extending radially and having an axially facing concave surface terminating radially away from said first member in an axially directed, circumferential lip,
 (l) said lip on said first ring extending farther from said first member than said lip on said first part, (m) said concave surface of said first part being in abutment with said first ring of a first sealing structure adjacent one end of said first member, (n) said lip of said first ring extending in the same axial direction as said lip on said first part, (o) said last means including a second part, said second part being annular and having a lower thermal coefficient of expansion than said rings to compensate for any contraction of said rings at low temperatures in excess of the contraction of said first member and said compressively engaging means; and (p) an annular spacer axially disposed in compressive relationship on said first member between each of said sealing structures, (q) each spacer having a concave surface and lip like that on said first part and being in abutment with first rings in sealing structures other than said first sealing structure.

7. The invention according to claim 6 in which said first and third rings are polytetrafluoroethylene and said second ring is one of the group consisting of polyethylene terephthalate and poly(1,4-cyclohexylene-dimethylene terephthalate).

8. An annular seal for slidably engageable annular members for use in extreme variations of temperature, said seal comprising:

(a) a first ring of polytetrafluoroethylene;

(b) a second ring of resilient material of one of the group consisting of polyethylene terephthalate and poly (1,4-cyclohexylene-dimethylene terephthalate) and being relatively stiffer than said first ring material and being substantially unaffected in resiliency by extreme temperatures;

(c) a third ring of polytetrafluoroethylene, (d) said first ring having a lateral face in abutment with a lateral face of said second ring and said second ring having its outer lateral face in abutment with a lateral face of said third ring; and (e) metal means axially, compressingly retaining said rings on said first member along an annular surface thereof which is slidably engageable along an annular surface of a second member, said rings to form a seal in an annular space between said members, (f) said metal means being annular and including an axially diverging, curved portion extending radially away from said first member and terminating in an axially directed circumferential lip extending toward said rings, (g) said curved portion being in abutment with the other lateral face of said first ring to hold the circumferential end portion thereof, which extends away from said first member, to form an axially directed circumferential lip extending toward said other rings and extending radially away from said first member a greater distance than said lip on said curved portion;

(h) a lip of said second ring biasing said first ring away from said first member and said lip of said first ring being radially between the lip of said second ring and said second member, (i) said lips of said first and second rings being generally radially between said third ring and said second member, (j) said metal means having axially directed, continuous annular projections forming and filling respective annular grooves in the other lateral faces of said first and third rings, said grooves being positioned radially relatively toward said first member, the lips being positioned generally radially between the grooves and the second member.

9. An annular seal for slidably engageable annular members for use in extreme variations of temperature, said seal comprising:

(a) a first ring of polytetrafluoroethylene;

(b) a second ring of resilient material of one of the group consisting of polyethylene terephthalate and poly(1,4-cyclohexylene - dimethylene terephthalate) and being relatively stiffer than said first ring material and being substantially unaffected in resiliency by extreme temperatures;

(c) a third ring of polytetrafluoroethylene, (d) said first ring having a lateral face in abutment with a lateral face of said second ring and said second ring having its outer lateral face in abutment with a lateral face of said third ring;

(e) metal means axially, compressingly retaining said rings on said first member along an annular surface thereof which is slidably engageable along an annular surface of a second member, said rings to form a seal in an annular space between said members, (f) said metal means being annular and including an axially diverging, curved portion extending radially away from said first member and terminating in an axially directed circumferential lip extending toward said rings, (g) said curved portion being in abutment with the other lateral face of said first ring to hold the circumferential end portion thereof, which extends away from said first member, to form an axially directed circumferential lip extending toward said other rings and extending radially away from said first member a greater distance than said lip on said curved portion;

(h) a lip of said second ring biasing said first ring away from said first member and said lip of said first ring being radially between the lip of said second ring and said second member, (i) said lips of said first and second rings being generally radially between said third ring and said second member, (j) said metal means having axially directed, continuous annular projections forming and filling respective annular grooves in the other lateral faces of said first and third rings, said grooves being positioned radially relatively toward said first member, the lips being positioned generally radially between the grooves and the second member; and (k) annular spring means in said metal means extending in the axial direction in compression alignment with said last means to maintain said rings in sealing compression at extreme low temperatures.

10. In two slidably engaged members for use in extreme temperatures and having an annular space therebetween to be sealed, an annular sealing structure comprising:

(a) a first member slidably engaged with a second member;

(b) an annular space between said members;

(c) a first resilient elastomeric ring secured on one of said members and having one of its circumferential edges extending toward said second member, (d) a second resilient ring abutting said first ring and having one of its circumferential edges extending toward said second member, said second ring being more rigid and more resilient at lower temperatures than said first ring;

(e) a lip at said one circumferential edge of said first ring making a sealing contact with said second member;

(f) a lip at said one circumferential edge of said second ring biasing the lip of said first ring toward and into sealing contact with said second member, (g) said lip of said first ring being radially between the lip of the second ring and said second member;

(h) a static elastomeric seal ring abutting the side of said second ring facing away from said first ring;

(i) annular means compressingly engaging said rings on said first member; and (j) annular low thermal expansion means in compression alignment with said last means to maintain said rings in sealing compression at extreme low temperatures, (k) said low thermal expansion means having a lower thermal coefficient of expansion than said annular means compressingly engaging said rings.

11. The invention according to claim 10 in which: said low thermal expansion means having a lower thermal coefficient of expansion than said rings.

12. In two slidably engaged members for use in extreme temperatures and having an annular space therebetween to be sealed, an annular sealing structure comprising:

(a) a first member slidably engaged with a second member;
(b) an annular space between said members;
(c) a first resilient elastomeric ring secured on one of said members and having one of its circumferential edges extending toward said second member,
(d) a second resilient ring abutting said first ring and having one of its circumferential edges extending toward said second member, said second ring being more rigid and more resilient at lower temperatures than said first ring;
(e) a lip at said one circumferential edge of said first ring making a sealing contact with said second member;
(f) a lip at said one circumferential edge of said second ring biasing the lip of said first ring toward and into sealing contact with said second member,
(g) said lip of said first ring being radially between the lip of the second ring and said second member;
(h) a static elastomeric seal ring abutting the side of said second ring facing away from said first ring;
(i) annular means compressingly engaging said rings on said first member; and
(j) annular low thermal expansion means in compression alignment with said last means to maintain said rings in sealing compression at extreme low temperatures,
(k) said low thermal expansion means having a lower thermal coefficient of expansion than said rings.

References Cited by the Examiner

UNITED STATES PATENTS

| 1,840,312 | 1/1932 | Dunmire | 277—110 |
| 2,481,121 | 9/1949 | Kasten | 277—112 |
| 3,062,555 | 11/1962 | Britton | 277—124 X |

FOREIGN PATENTS 976,666  11/1950  France.

LAVERNE D. GEIGER, *Primary Examiner.*

SAMUEL ROTHBERG, *Examiner.*

L. RANEY, J. MEDNICK, *Assistant Examiners.*